United States Patent [19]
Hyde

[11] Patent Number: 5,851,056
[45] Date of Patent: Dec. 22, 1998

[54] AIRCRAFT BRAKE HEAT SHIELD HAVING EASILY REMOVED HEAT SHIELD SECTIONS

[75] Inventor: Robert William Hyde, Stow, Ohio

[73] Assignee: The B. F. Goodrich Company, Richfield, Ohio

[21] Appl. No.: 656,750

[22] Filed: Jun. 3, 1996

[51] Int. Cl.⁶ ................................ F16D 65/84
[52] U.S. Cl. ................ 301/6.91; 188/264 G
[58] Field of Search .............. 301/6.1, 6.3, 6.8, 301/6.91, 6.2; 188/71.6, 264 G, 264 AA

[56] References Cited

U.S. PATENT DOCUMENTS

| | | | |
|---|---|---|---|
| 3,051,528 | 8/1962 | Rogers | 301/6.1 |
| 3,958,833 | 5/1976 | Stanton | 301/6.2 |
| 4,017,123 | 4/1977 | Horner et al. | 301/6.91 |
| 4,084,857 | 4/1978 | VanderVeen | 301/6.2 |
| 4,856,619 | 8/1989 | Petersen | 188/18 A |
| 5,002,342 | 3/1991 | Dyko | 301/6.91 |
| 5,024,297 | 6/1991 | Russell | 188/18 A |
| 5,107,968 | 4/1992 | Delpassand | 188/264 G |
| 5,236,249 | 8/1993 | Han et al. | 301/6.91 |
| 5,248,013 | 9/1993 | Hogue et al. | 188/264 G |

*Primary Examiner*—Russell D. Stormer
*Attorney, Agent, or Firm*—Kevin L. Leffel

[57] ABSTRACT

The invention is in the field of heat shields for aircraft wheel and brake assemblies. More particularly, the invention relates to such heat shields having removable sections. According to an aspect of the invention, a heat shield is provided for attachment to an aircraft wheel having a hub and a tube well concentric with the hub, a web interconnecting the hub and the tube well, and a plurality of torque bars fixed to the wheel generally parallel to the axis of rotation of the wheel and spaced from the tube well. The heat shield comprises a plurality of heat shield sections to be disposed between adjacent torque bars and spaced from the tube well, and a plurality of elongate heat shield carriers to be fixed to the wheel generally parallel to the axis of rotation of the wheel and spaced from the tube well with the heat shield carriers superposing the torque bars and engaging the plurality of heat shield sections. The plurality of heat shield sections and the plurality of elongate heat shield carriers define a generally cylindrical wall concentric with the tube well and defining an annular space therebetween.

22 Claims, 6 Drawing Sheets

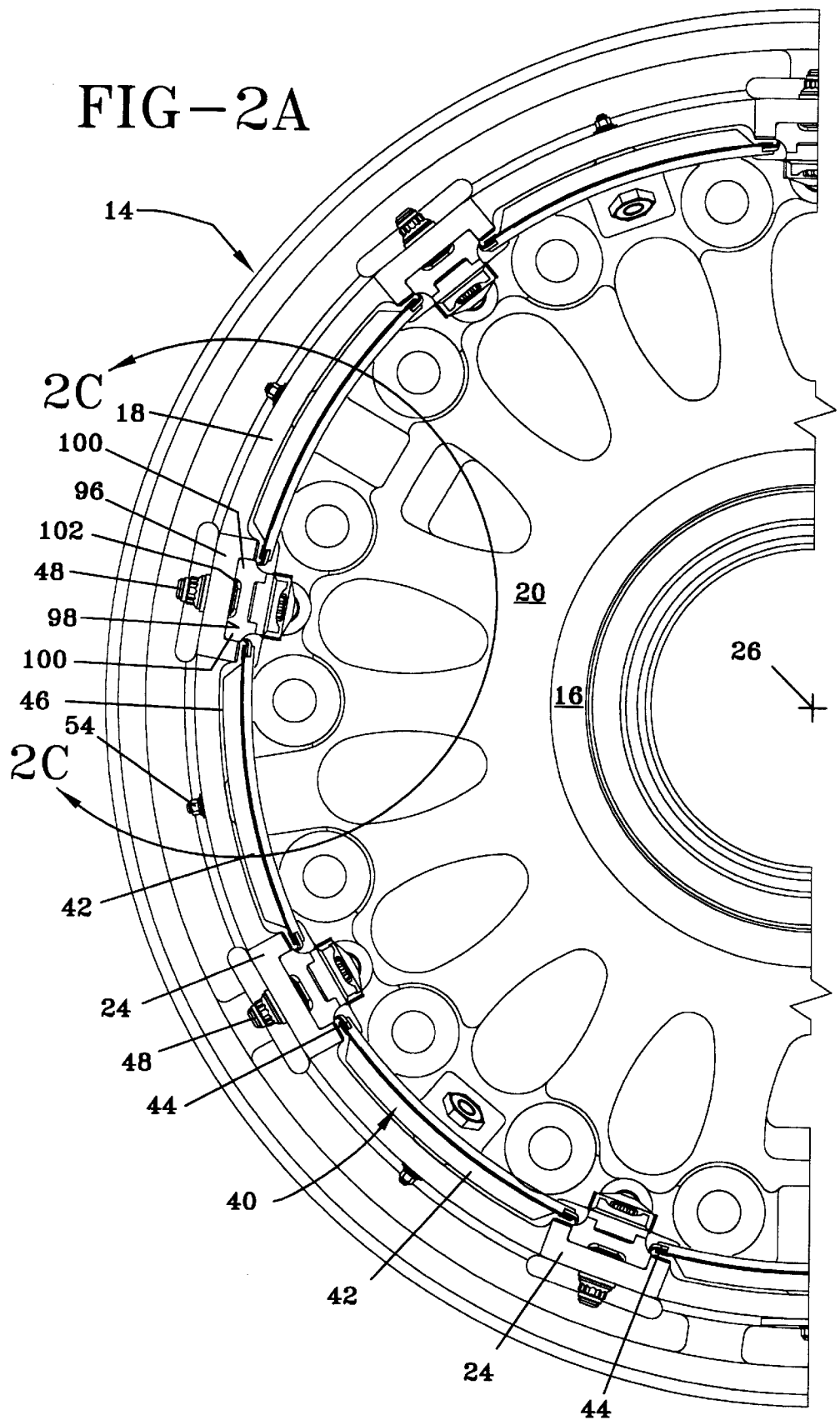

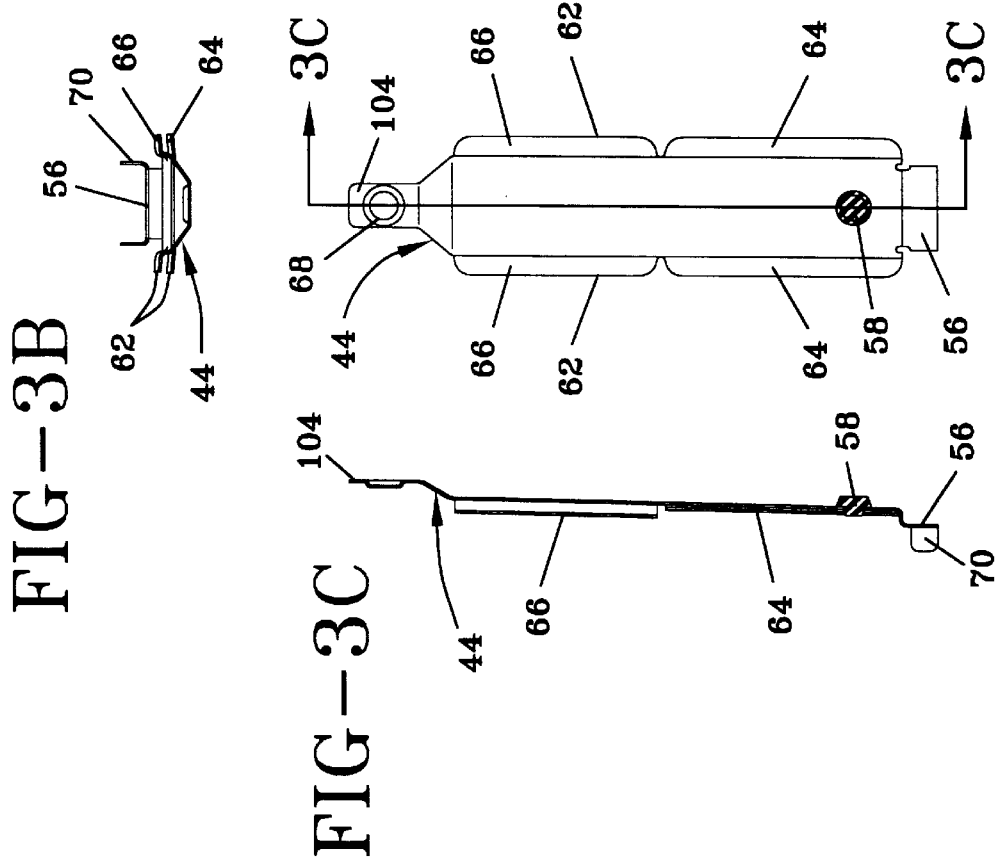

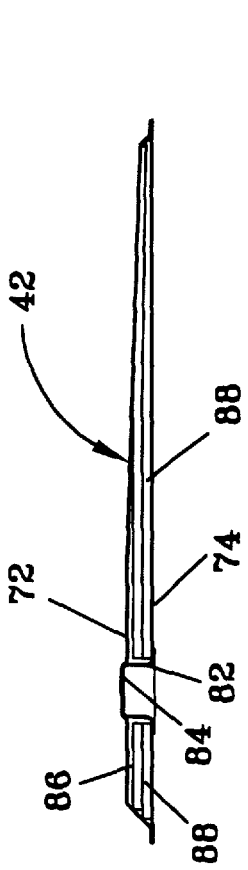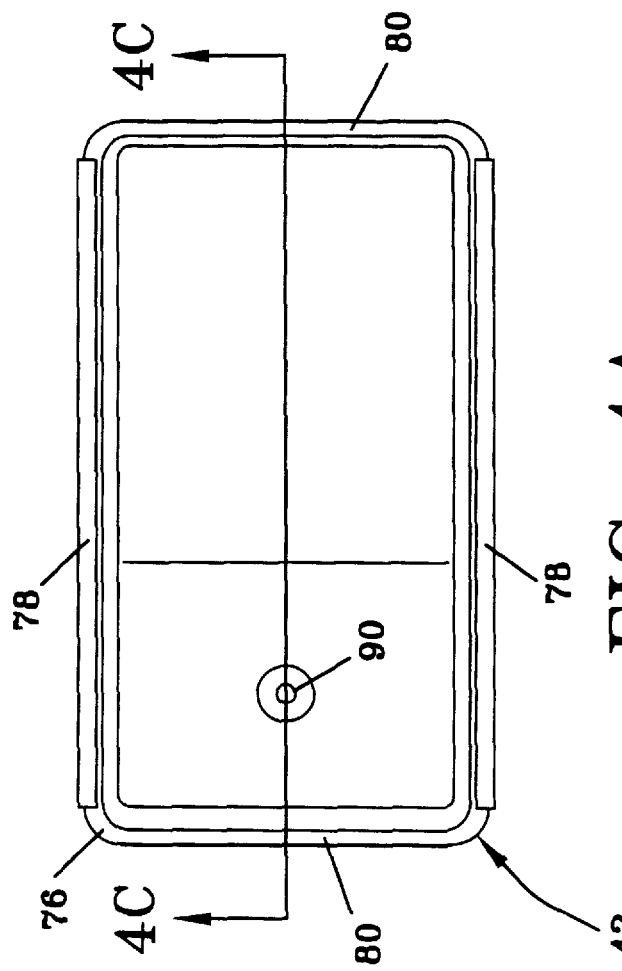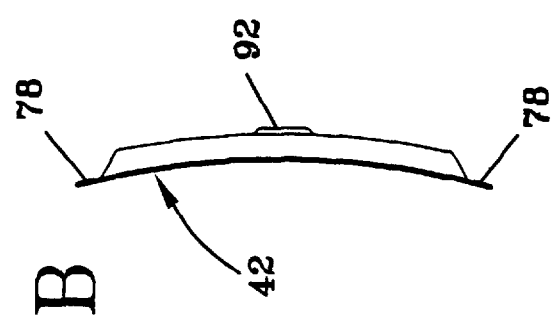

AIRCRAFT BRAKE HEAT SHIELD HAVING EASILY REMOVED HEAT SHIELD SECTIONS

BACKGROUND

The invention is in the field of heat shields for aircraft wheel and brake assemblies. More particularly, the invention relates to such heat shields having removable sections.

Heat shields have been used for many years in aircraft wheel and brake assemblies in order to prevent conduction and radiation to the aircraft wheel of heat energy generated in the brake disks during braking. Excessive temperatures in the aircraft wheel can damage the wheel and the aircraft tire. The heat shield also prevents hot brake material ejected from the brake disks during braking from being slung against the inside of the wheel, which can also damage the wheel and further contribute to excessive temperatures. An early example of a heat shield is described by U.S. Pat. No. 3,051,528 issued in 1962 to R. R. Rogers. The Rogers heat shield comprises a multitude of curved heat shield sections captivated between adjacent drive keys. More recent examples are described by U.S. Pat. No. 4,017,123 issued in 1977 to Horner et al. and U.S. Pat. No. 4,084,857 issued in 1978 to VanderVeen. These heat shields also comprise curved heat shield sections captivated between adjacent drive keys. The Horner et al. heat shield sections are captive between the drive key caps and ledges formed on the drive keys. The ledges and drive keys are integrally formed with the wheel, which is typical of wheel and brake assemblies having steel disks. Horner et al. states that the heat shield sections could be used with the removable keys presented in Rogers. However, exactly how this would be accomplished is not clear because the Rogers drive keys do not have ledges or drive key caps. The VanderVeen heat shield section is captive between the drive key cap and an additional cap having a pair of wings that extend from either side of the drive key. The drive keys are integrally formed with the wheel, and wings eliminate the need for the ledges of Horner et al. The heat shields described thus far are representative of the technology developed for wheel and brake assemblies having steel brake disks with metallic friction linings.

The advent of carbon/carbon brake disks instigated further development of heat shields. Carbon/carbon brakes generally operate at a much higher temperature than their steel counter-parts, which necessitated further steps to minimize conduction and radiation of heat energy into the aircraft wheel. Most wheel and brake assemblies having carbon/carbon brakes now have removable torque bars that are spaced from the inside of the aircraft wheel, with attachments at either end. This arrangement minimizes the conductive path from the torque bars to the wheel. Heat shield contact with the torque bars is preferably minimized for the same reasons. In addition, radiation is a major source of heat transfer from carbon/carbon brakes, which necessitates that the heat shield fully encircle the brake disks with minimum holes or breaks that permit direct radiation of heat energy to the aircraft wheel. Conduction is another major source of heat transfer in carbon/carbon brakes, which is minimized by minimizing contact of the torque bars and heat shield with the aircraft wheel. These considerations caused a significant departure from the previous heat shield technology for steel brakes.

According to one prior art approach, a single piece full circle heat shield is attached to the wheel and brake assembly between the wheel and the torque bars. The heat shield is spaced from both the torque bars and the aircraft wheel in order to minimize heat conduction to the heat shield from the torque bars. The heat shield comprises two cylindrical stainless steel sheets spaced from each other, with insulation in between. A heat shield constructed in such manner, though certainly safe and effective, embodies some undesirable characteristics. For example, the shield tends to warp and buckle during use due to thermal expansion and contraction induced by braking cycles. In addition, removing a damaged heat shield generally requires removing all the torque bars from the aircraft wheel assembly. A heat shield that partially solves these problems is described in U.S Pat. No. 5,002,342 issued in 1991 to Dyko. The Dyko shield comprises a plurality of heat shield sectors that together define a full circle heat shield. The edges of the heat shield are interleaved in a manner that permits relative expansion and contraction of the heat shield sectors induced by thermal gradients. This feature reduces the tendency of the heat shield to warp and buckle during use. Dividing the heat shield into sectors requires only the removal of those torque bars corresponding to that sector. Individual sectors may be removed and replaced as necessary without replacing the entire heat shield. A similar heat shield having sectors connected by hinged edges is described in U.S. Pat. No. 5,236,249 issued in 1993 to Han et al.

In spite of these improvements, the Dyko and Han et al. heat shields still require removal of at least some torque bars to replace a sector, and each sector comprises a relatively large portion of the entire heat shield. Removing and replacing any of the torque bars is preferably avoided. Therefore, a heat shield is desired having easily removed individual heat shield sections without removing any torque bars, and the heat shield should be suitable for use with carbon/carbon brake disks.

SUMMARY OF THE INVENTION

According to an aspect of the invention, a heat shield is provided for attachment to an aircraft wheel having a hub and a tube well concentric with the hub, a web interconnecting the hub and the tube well, and a plurality of torque bars fixed to the wheel generally parallel to the axis of rotation of the wheel and spaced from the tube well, comprising:

a plurality of heat shield sections to be disposed between adjacent torque bars and spaced from the tube well; and, a plurality of elongate heat shield carriers to be fixed to the wheel generally parallel to the axis of rotation of the wheel and spaced from the tube well with the heat shield carriers superposing the torque bars and engaging the plurality of heat shield sections, the plurality of heat shield sections and the plurality of elongate heat shield carriers thereby defining a generally cylindrical wall concentric with the tube well and defining an annular space therebetween.

According to further aspects of the invention, a wheel and heat shield assembly is provided, and a wheel and brake assembly having a heat shield is provided, the heat shield having the characteristics noted in the previous paragraph. The heat shield according to the invention has easily removed heat shield sections that are removable without loosening or removing any torque bars, and the heat shield is suitable for use with carbon/carbon brake disks.

BRIEF DESCRIPTION OF THE FIGURES

FIG. 2A is the left half of a front view of a full wheel and heat shield assembly according to an aspect of the invention, looking into the wheel from the left side of FIG. 1.

FIG. 3A is the top view of an elongate heat shield carrier according to an aspect of the invention.

FIG. 3B is a front elevation view of the FIG. 3A elongate heat shield carrier.

FIG. 3C is a cross-sectional side view along line 3C—3C of FIG. 3A.

FIG. 4A is the top view of a heat shield section according to an aspect of the invention.

FIG. 4B is a front elevation view of the FIG. 4A heat shield section.

FIG. 4C is a cross-sectional side view along line 4C—4C of FIG. 4A.

FIG. 5 is a top view of a heat shield section engaged with an elongate heat shield carrier, according to an aspect of the invention.

DETAILED DESCRIPTION

Figure 1:
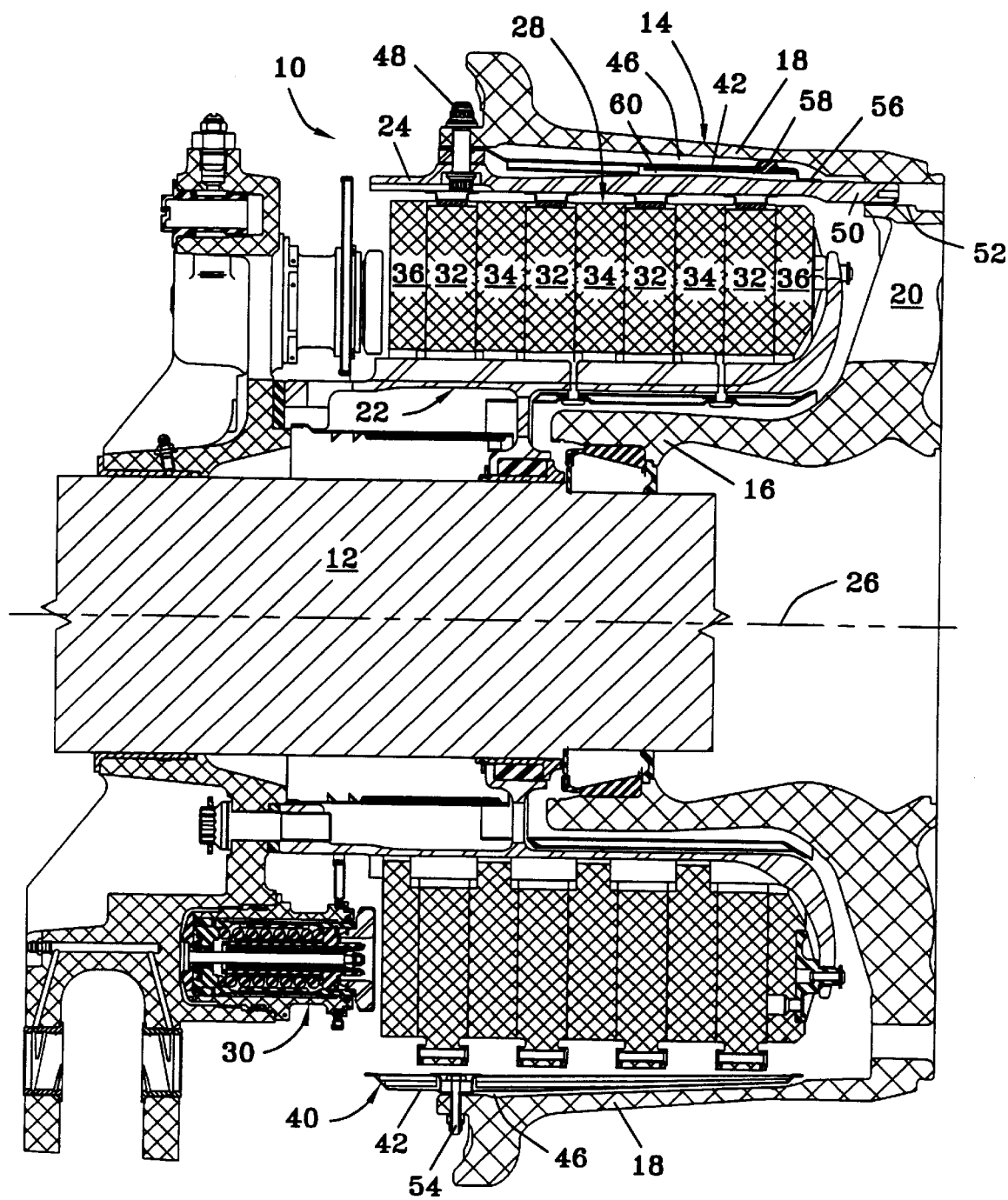
FIG. 1 is a side cross-sectional view of a wheel and brake assembly according to an aspect of the invention mounted on an aircraft bogie axle.

Various aspects of the invention are presented in FIGS. 1–5, wherein like components are numbered alike. Referring now to FIG. 1, a side cross-sectional view is presented of an aircraft wheel and brake assembly 10 according to an aspect of the invention mounted on an aircraft bogie axle 12. The wheel and brake assembly 10 comprises a wheel 14 (only one wheel-half shown for clarity) having a hub 16 and a tube well 18 concentric with the hub 16, and a web 20 interconnecting the hub 16 and the tube well 18. A torque take-out assembly 22 aligned with the hub 16, and the wheel 14 is rotatable relative to the torque take-out assembly 22. A plurality of torque bars 24 are fixed to the wheel 14 generally parallel to the axis of rotation 26 of the wheel and spaced from the tube well 18. A heat sink 28 is disposed within the wheel 14, and comprises brake or friction disks in the form of rotors 32 and stators 34. The rotors 32 are engaged against rotation to the torque bars 24, and the stators 34 are engaged against rotation to the torque take-out assembly 22. The stators 34 may also comprise a pressure plate 36 and end plate 38 on the ends of the heat sink 28, which are also engaged against rotation to the torque take-out assembly 22. The friction disks may be formed from any material suitable for friction disks, including metals, such as steel with a sintered metallic friction lining, and ceramics or carbon materials, such as a carbon/carbon material. According to a preferred embodiment, the heat sink 28 is a carbon/carbon composite heat sink having at least one carbon/carbon rotor 32 interleaved with a plurality of carbon/carbon stators 34. At least one actuator 30 is fixed to the torque take-out assembly 22 configured to compress the heat sink 28. In the example presented, the actuator is a hydraulically actuated piston, but other types of actuators may be used in the practice of the invention, such as electromechanical actuators. A heat shield 40, according to an aspect of the invention, is attached to the wheel 14 disposed between the tube well 18 and the heat sink 28.

Figure 2B:
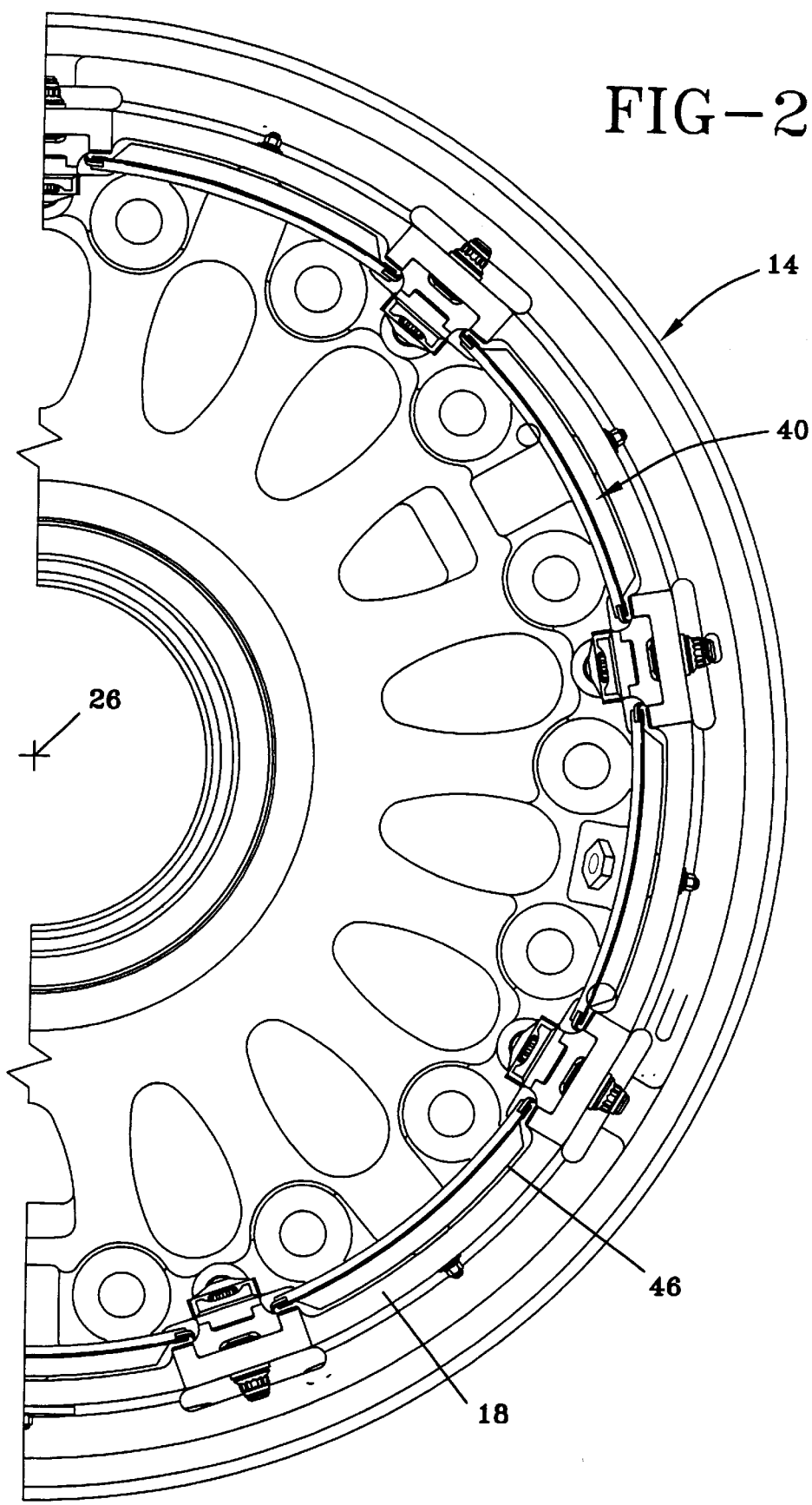
FIG. 2B is the right half of a front view of a full wheel and heat shield assembly according to an aspect of the invention, looking into the wheel from the left side of FIG. 1.

Referring now to FIGS. 2A and 2B, the left and right half portions of a front view of a full wheel and heat shield assembly is presented looking into the wheel 14 from the left side of FIG. 1. Pertinent features previously discussed in relation to FIG. 1 are also presented in FIG. 2. The heat shield 40 is concentric with the tube well 18 and has a plurality of heat shield sections 42 disposed between adjacent torque bars 24 and spaced from the tube well 18, and a plurality of elongate heat shield carriers 44 fixed to the wheel 14 generally parallel to the axis of rotation 26 of the wheel 14 intermediate the torque bars 24 and the tube well 18. The heat shield carriers 44 are spaced from the tube well 18, and superpose the torque bars 24 and engage the plurality of heat shield sections 42. Spacing the heat shield carriers from the torque bars 24 minimizes conductive heat transfer to the wheel 14, and superposing the heat shield carriers 44 over the torque bars 24 minimizes radiation heat transfer from the torque bars to the tube well 18. The heat shield 40 and the tube well 18 define an annular space 46 therebetween, preferably occupied by air. Contact of the heat shield sections 42 and/or the heat shield carriers 44 with the tube well 18 can cause fretting and increase conductive heat transfer to the tube well 18, both of which are undesirable. The manner in which the heat shield carriers engage the heat shield sections 42 will be discussed in greater detail with reference to FIGS. 3–5. Referring to FIGS. 1, 2A and 2B, the torque bars 24 and heat shield carriers 44 are preferably attached to the wheel 14 by torque bar bolts 48. The torque bars 24 are spaced from the tube well 18 in order to minimize heat transfer into the tube well 18 during braking. Each torque bar 24 preferably has a pin 50 at the end opposite the torque bar bolts 48 that is received within a hole 52 in the web 20.

As best presented in FIG. 1, the heat shield carriers 44 are preferably spaced from the torque bars 24 toward the tube well 18. The space 60 between the torque bars 24 and heat shield carriers 44 is preferably filled with air, and serves to insulate the heat shield carriers 44 from the torque bars 24, and reduces the maximum temperature generated in the heat shield carrier 44 during braking. Reducing the maximum temperature in the heat shield carrier 44 reduces the amount of heat energy radiated to the tube well 18 during braking, thereby increasing the effectiveness of the heat shield 40. The heat shield carriers may have support portions 56 that ride on the torque bars 24, and resilient restraints 58 that contact the tube well 18 that restrain radial movement of the heat shield carriers 44 toward the tube well 18. The area of contact between the torque bars 24 and heat shield carriers 44 is preferably minimized in order to minimize the amount of heat conduction into the heat shield carriers 44 during braking.

According to a preferred embodiment, the heat shield sections 42 are removable without loosening and/or removing any torque bars 24. Referring again to FIGS. 1 and 2, the heat shield sections 42 may be attached to the tube well 18 by suitable fasteners, for example, heat shield bolts 54. The heat shield sections 42 may accumulate damage that necessitates replacement before scheduled maintenance of the wheel and brake assembly. If this occurs, one or more damaged heat shield sections 42 may be replaced by removing the heat shield bolts 54 for those sections, pulling the damaged sections from the wheel and heat assembly, inserting new heat shield sections 42, and replacing the heat shield bolts 54. This may be accomplished without removing a single torque bar 24. This greatly facilitates field repair of the heat shield 40.

Referring now to FIGS. 3A, 3B, and 3C, various views are presented of an embodiment of a heat shield carrier according to an aspect of the invention. The elongate heat shield carrier 44 is preferably generally flat (not arcuate about the axis of rotation 26), and may be manufactured by forming or stamping a flat piece of stainless steel in a series of operations. The heat shield carriers 44 is generally configured as a flat strip having a pair of opposite edges 62. Referring to FIGS. 1 and 3, the opposite edges 62 of the heat shield carrier 44 are generally parallel to the axis of rotation 26 of the wheel 14, and may be configured as a groove-like edge. As used herein, the term "groove-like edge" refers to any edge geometry that receives a tongue or tab structure and restrains inward and outward radial movement of such structure. In the example presented, each groove-like edge comprises a first tab 64 proximate the web 20 configured to restrain radial movement of an adjacent heat shield section 42 toward the tube well 18, and a second consecutive tab 66 spaced from the web 20 configured to restrain radial movement of the heat shield section 42 toward the torque bar 24. Other configurations for the groove-like edges are apparent to those skilled in the art, in light of the description provided herein, any of which are considered to fall within the purview of the invention. For example, both the first tab 64 and second tab 66 could extend the full length of the edges 62. However, the example presented is inexpensive to manufacture, and is effective in restraining radial movement of the heat shield sections 42.

Figure 2C:
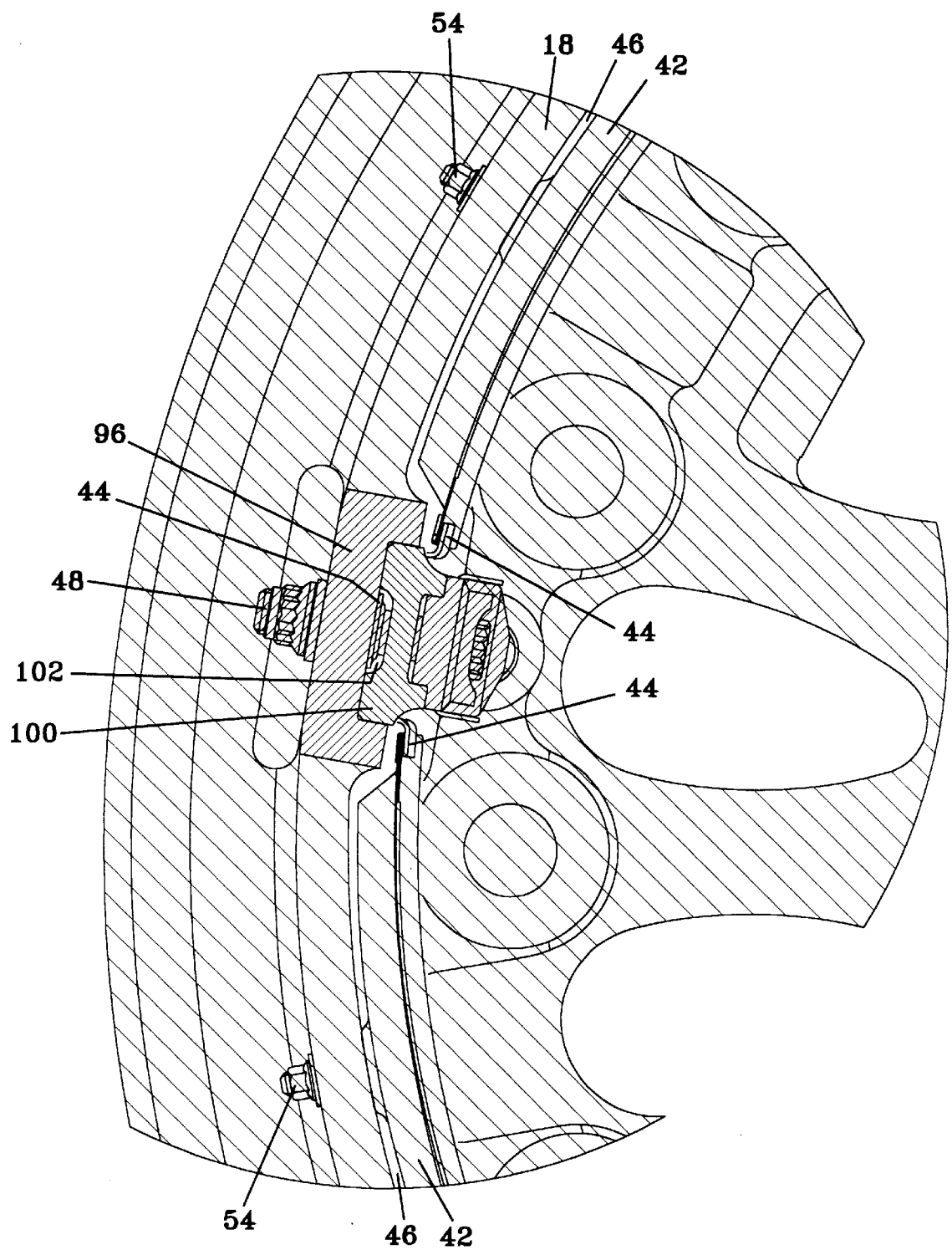
FIG. 2C in an enlarged view of the area indicated as 2C—2C in FIG. 2A.

A mounting hole 68 that receives the torque bar bolt 48 is provided in a mounting portion 104 of the heat shield carrier 44. A raised edge 94 encircling the mounting hole 68 may be provided. As will become evident, the raised portion 94 minimizes or prevents radial movement of the mounting portion 104. As best depicted in FIG. 2A, a spacer 96 is provided between the torque bar 24 and the wheel 14. The spacer 96 has a channel 98 keyed to a pair of ledges 100 on the torque bar 24. The spacer 96 is recessed between the ledges 100, thus providing a spacer air space 102 which reduces conductive heat transfer from the torque bar 24 to the wheel 14, as best shown in FIG. 2C. Referring again to FIGS. 3A–3B, the mounting portion 104 of heat shield carrier 44 is inserted into spacer air space 102. The raised edge 94, in combination with the thickness the mounting portion 104, is dimensioned equal to or just slightly less than the thickness of the spacer air space 102, thereby restraining undesired radial movement of the mounting portion 104 within spacer air space 102 between the wheel 14 and spacer 96. Dimensioning the raised edge 94, as noted, also limits or prevents imposing a compressive force on the mounting portion 104 when the torque bar bolts 48 are installed and tightened.

The support portion 56 is formed as a tab offset from the body of the heat shield carrier 44. The support portion 56 has a pair of ears 70 bent around the torque bar 24 spaced from each other a distance slightly greater than the width of the torque bar 24. A hole is also provided to receive the resilient restraint 58, which may be formed from resilient materials having good insulating qualities and suitable resistance to the associated application temperatures, for example a silicone elastomer. The resilient restrain 58 prevents the heat shield carrier 44 from rubbing against the tube well 18 during rotation, as well as ensuring engagement of the heat shield carrier 44 with the torque bar 24.

Referring now to FIGS. 4A, 4B, and 4C, various views are presented of an embodiment of a heat shield section according to a further aspect of the invention. Heat shield section 42 preferably comprises an upper sheet 72, and a lower sheet 74. The upper sheet 72 may take the shape of a pan having a lip 76, and is joined to the lower sheet 74 around the circumference of the heat shield section 42 at the lip 76 by suitable means, including spot welding and/or bending a tab from the lower sheet 74 around the lip 76. A portion of the lip 76 preferably forms a pair of opposite tongue-like edges 78 generally parallel to the axis of rotation 26 of the wheel 14 (FIG. 1). Joints that permit relative movement induced by thermal expansion and contraction are generally employed, where possible, to provide thermal stress relief and minimize thermal stress warpage of the heat shield section 42. In the example presented, tabs from the lower sheet 74 are bent around the lip 76 along edges 78 without rigidly fixing the upper sheet 72 and lower sheet 74 to each other in order to permit relative movement due to thermal expansion and contraction. The upper sheet 72 and lower sheet 74 at one or both of end portions 80 of lip 76 may be rigidly fixed by suitable means, including spot and seam welding. Welding only one end portion 80 of lip 76 provides the maximum amount of movement for thermal expansion and contraction. In such case, tabs (not shown) from the lower sheet 74 are bent around only one end portion 80 of lip 76 opposite the end portion 80 that is welded. In practice however, bending tabs from the lower sheet 74 around an arcuate end portion 80 is difficult and increases manufacturing cost, and a heat shield section 42 having the upper sheet 72 and lower sheet 74 welded together at both end portions 80 has been found to be sufficiently resistant to thermal stress warping. A cup 82 may be inserted through a corresponding hole in the lower sheet 74 and be rigidly fixed to the lower sheet 74 by suitable means, including spot welding.

When completed, the upper sheet 72 and lower sheet 74 define a space 84 therebetween. The cup 82 may be configured to help maintain a desired spacing between the upper sheet and 72 and lower sheet 74 by defining a ledge 84 that rests against the upper sheet 72. The space 86 may be filled with only air, but is preferably filled with a suitable insulating material 88, for example, a ceramic paper. If filled with air, a thin stainless steel foil may be provided as a radiant heat barrier between the upper sheet 72 and lower sheet 74. The stainless steel foil may be dimpled to maintain its position between the upper and lower sheets 72 and 74. A heat shield mounting hole 90 may be formed in the cup 82 and top sheet 72 for receiving a heat shield bolt 54 (FIGS. 1 and 2) that fixes the heat shield section 42 to the wheel 14. A raised bearing surface 92 may also be provided to help ensure that the bulk of the heat shield section 42 is spaced from the tube well 18. The upper sheet 72, the lower sheet 74, and the cup 82 are preferably formed from a stainless steel alloy. The heat shield section may be flat or curved (arcuate), but is preferably curved in order optimize space inside the wheel and brake assembly, as presented in the drawings. Configuring the heat shield sections 42 in the manner described herein permits the heat shield sections 42 to closely follow the geometry of the tube well 18 and optimize heat shield geometry to maximize heat shielding in the available space.

Referring now to FIG. 5, a top view of a heat shield section 42 engaged with an adjacent elongate heat shield carrier 44 is presented, according to an aspect of the invention. The opposite edges 62 of the heat shield carrier 44 are configured as groove-like edges, and receive the tongue-like edges 78 of the heat shield section 42. Tab 64 is configured to restrain radial movement of the heat shield section 42 toward the tube well 18 (FIGS. 1 and 2), and Tab 66 is configured to restrain radial movement of the heat shield section 42 toward the torque bar 24 (FIGS. 1 and 2). Thus, the opposite edges 62 of the heat shield carrier 44 are configured to cooperate with the heat shield sections 42 to restrain radial movement of the heat shield sections 42. The opposite edges 62 of the heat shield carrier 44 also cooperate with the heat shield sections 42 to restrain rotation of the heat shield sections 42 around the heat shield bolts 54. The distance between the tongue-like edges 78 is dimensioned to allow circumferential thermal expansion and contraction of the heat shield sections 42 when installed between the heat shield carriers 44. Other geometric configurations are evident to those skilled in the art, and any such variations are considered to fall within the purview of this invention.

It is evident that many variations are possible without departing from the true scope of the invention, as defined by the following claims.

I claim:

1. An aircraft wheel and heat shield assembly, comprising:
   a wheel having a hub and a tube well concentric with said hub, and a web interconnecting said hub and said tube well;
   a plurality of torque bars fixed to said wheel generally parallel to the axis of rotation of said wheel and spaced from said tube well; and,
   a heat shield attached to said wheel concentric with said tube well and having a plurality of heat shield sections disposed between adjacent torque bars and spaced from said tube well, and a plurality of elongate heat shield carriers fixed to said wheel generally parallel to the axis of rotation of said wheel and spaced from said tube well, said heat shield carriers superposing said torque bars and engaging said plurality of heat shield sections said heat shield and said tube well defining an annular space therebetween.

2. The assembly of claim 1, wherein said torque bars are removable and said heat shield sections are removable without removing any torque bars.

3. The assembly of claim 1, wherein said elongate heat shield carriers are generally flat.

4. The assembly of claim 1, wherein said elongate heat shield carriers are spaced from said torque bars toward said tube well.

5. The assembly of claim 1, wherein said elongate heat shield carriers are spaced from said torque bars toward said tube well, said heat shield carriers having support portions that ride on said torque bars, and resilient restraints contacting said tube well that restrain radial movement of said heat shield carriers toward said tube well.

6. The assembly of claim 1, wherein said torque bars removable, and further comprising a plurality of torque bar fasteners that attach said torque bars to said wheel, said heat shield sections being removable without loosening said torque bar fasteners.

7. The assembly of claim 1, wherein said torque bars are removable and further comprising a plurality of torque bar fasteners that attach said torque bars and said heat shield carriers to said wheel, said heat shield sections being removable without loosening said torque bar fasteners.

8. The assembly of claim 1, wherein said heat shield sections comprise a pair of opposite edges generally parallel to the axis of rotation of the wheel, said elongate heat shield carriers cooperating with said opposite edges to restrain radial movement of said heat shield sections.

9. The assembly of claim 1, wherein said heat shield sections comprise a pair of opposite tongue-like edges generally parallel to the axis of rotation of said wheel, said heat shield carriers having a pair of groove-like edges that receive said tongue-like edges to restrain radial movement of said curved heat shield sections.

10. The assembly of claim 1, wherein said heat shield carriers comprise a pair of opposite edges generally parallel to the axis of rotation of said wheel, each said edge having a first tab proximate said web configured to restrain radial movement of an adjacent heat shield section toward said tube well and a second consecutive tab spaced from said web configured to restrain radial movement of said adjacent heat shield section toward said torque bar.

11. An aircraft wheel and heat shield assembly, comprising:
    a wheel having a hub and a tube well concentric with said hub, and a web interconnecting said hub and said tube well;
    a plurality of removable torque bars fixed to said wheel generally parallel to the axis of rotation of said wheel and spaced from said tube well;
    a heat shield attached to said wheel concentric with said tube well and having a plurality of heat shield sections disposed between adjacent torque bars and spaced from said tube well, said heat shield sections being removable without removing any torque bars, and a plurality of elongate heat shield carriers fixed to said wheel generally parallel to the axis of rotation of said wheel intermediate said torque bars and said tube well, said heat shield carriers being spaced from said torque bars and said tube well, said heat shield carriers superposing said torque bars and engaging said plurality of heat shield sections, said heat shield and said tube well defining an annular space therebetween.

12. The assembly of claim 11, wherein said heat shield carriers have support portions that ride-on said torque bars, and resilient restraints contacting said tube well that restrain radial movement of said heat shield carriers toward said tube well.

13. The assembly of claim 11, wherein said heat shield carriers comprise a pair of opposite edges generally parallel to the axis of rotation of said wheel, each said edge having a first tab proximate said web configured to restrain radial movement of an adjacent heat shield section toward said tube well and a second consecutive tab spaced from said web configured to restrain radial movement of said adjacent heat shield section toward said torque bar.

14. A heat shield for attachment to an aircraft wheel having a hub and a tube well concentric with the hub, a web interconnecting the hub and the tube well, and a plurality of torque bars fixed to the wheel generally parallel to the axis of rotation of the wheel and spaced from the tube well, comprising:
    a plurality of heat shield sections to be disposed between adjacent torque bars and spaced from the tube well; and,
    a plurality of elongate heat shield carriers to be fixed to the wheel generally parallel to the axis of rotation of the wheel and spaced from the tube well with said heat shield carriers superposing the torque bars and engaging said plurality of heat shield sections, said plurality of heat shield sections and said plurality of elongate heat shield carriers thereby defining a generally cylindrical wall concentric with said tube well and defining an annular space therebetween.

15. The heat shield of claim 14, wherein said elongate heat shield carriers are generally flat.

16. The heat shield of claim 14, wherein said heat shield carriers have support portions that ride on the torque bars, and resilient restraints that contact the tube well and restrain radial movement of said heat shield carriers toward the tube well.

17. The heat shield of claim 14, wherein said heat shield sections comprise a pair of opposite edges generally parallel to the axis of rotation of the wheel, said elongate heat shield carriers cooperating with said opposite edges to restrain radial movement of said heat shield sections.

18. The heat shield of claim 14, wherein said heat shield sections comprise a pair of opposite tongue-like edges generally parallel to the axis of rotation of the wheel, said heat shield carriers having a pair of groove-like edges that receive said tongue-like edges to restrain radial movement of said heat shield sections.

19. The heat shield of claim 14, wherein said heat shield carriers comprise a pair of opposite edges generally parallel to the axis of rotation of the wheel, each said edge having a first tab proximate said web configured to restrain radial movement of an adjacent heat shield section toward said tube well and a second consecutive tab spaced from said web configured to restrain radial movement of said adjacent heat shield section toward said torque bar.

20. An aircraft wheel assembly, comprising:
   a wheel having a hub and a tube well concentric with said hub, and a web interconnecting said hub and said tube well;
   a torque take-out assembly aligned with said hub, said wheel being rotatable relative to said torque take-out assembly;
   a plurality of removable torque bars fixed to said wheel generally parallel to the axis of rotation of said wheel and spaced from said tube well;
   a carbon/carbon composite heat sink having at least one carbon/carbon rotor interleaved with a plurality of carbon/carbon stators, said rotors being engaged against rotation to said torque bars, said stators being engaged against rotation to said torque take-out assembly;
   at least one actuator fixed to said torque take-out assembly configured to compress said heat sink;
   a heat shield concentric with said tube well and having a plurality of heat sheild sections between adjacent torque bars and spaced from said tube well, said heat shield being removable without removing any torque bars, and a plurality of elongate heat shield carriers fixed to said wheel generally parallel to the axis of rotation of said wheel intermediate said torque bars and said tube well, said heat shield carriers being spaced from said torque bars and said tube well, said heat shield carriers superposing said torque bars and engaging said plurality of heat shield sections, said heat shield and said tube well defining an annular space therebetween.

21. The assembly of claim 20, wherein said heat shield carriers have support portions that ride on said torque bars, and resilient restraints contacting said tube well that restrain radial movement of said heat shield carriers toward said tube well.

22. The assembly of claim 20, wherein said heat shield carriers comprise a pair of opposite edges generally parallel to the axis of rotation of said wheel, each said opposite edge having a first tab proximate said web configured to restrain radial movement of an adjacent heat shield section toward said tube well and a second consecutive tab spaced from said web configured to restrain radial movement of said adjacent heat shield section toward said torque bar.

* * * * *